UNITED STATES PATENT OFFICE.

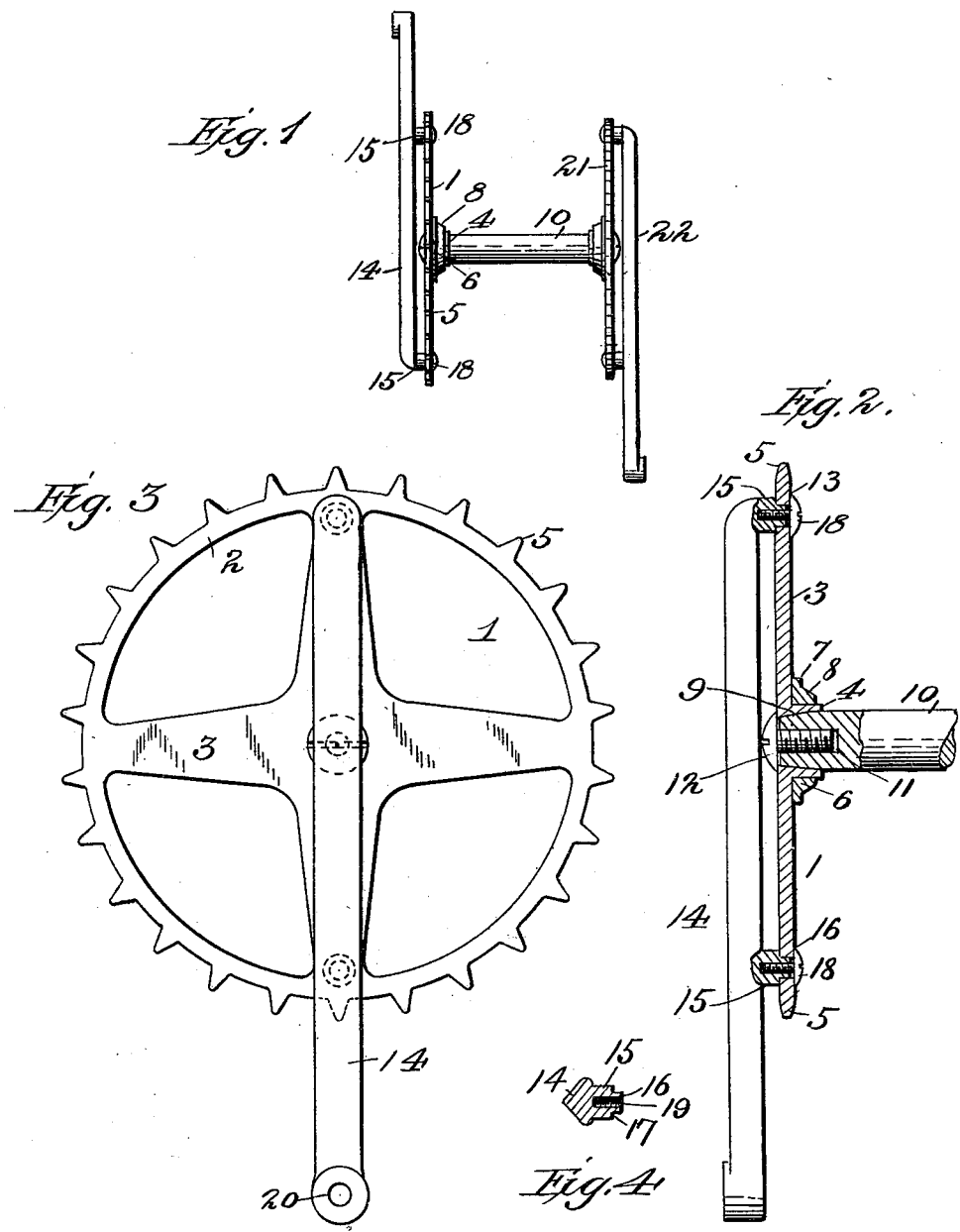

CHRISTIAN ALLMAN, OF HUNTINGTON, INDIANA.

BICYCLE-CRANK.

SPECIFICATION forming part of Letters Patent No. 667,053, dated January 29, 1901.

Application filed July 31, 1900. Serial No. 25,397. (No model.)

*To all whom it may concern:*

Be it known that I, CHRISTIAN ALLMAN, a citizen of the United States, residing at Huntington, in the county of Huntington and State of Indiana, have invented new and useful Improvements in Bicycle-Cranks, of which the following is a specification.

My invention relates to bicycle-cranks; and one object of the same is to provide a simple and efficient crank mechanism for bicycles and to provide means whereby the axle may be properly balanced and the power applied at opposite sides of the axle at points as far therefrom as possible in order to increase the leverage.

Another object is to provide a straight-bar crank for the sprocket-wheel and a similar crank for a plain wheel, said wheels being secured to the axle at its opposite ends and the cranks being secured to the sprocket-wheel and the plain wheels at points in line with but as remote from the axial center of the axle as possible in order to get an increased leverage and to give the required balance to the crank mechanism.

I attain these objects by means of the construction shown in the accompanying drawings, in which—

Figure 1 is a perspective view of a bicycle-axle, showing the cranks secured thereto in a manner involving my invention. Fig. 2 is a vertical section through the same. Fig. 3 is a side elevation of the sprocket-wheel and crank. Fig. 4 is a detail section through the crank at one of its points of attachment to the sprocket-wheel.

Like numerals of reference designate like parts wherever they occur in the different views.

In said drawings the numeral 1 designates a sprocket-wheel, which may be of ordinary construction, consisting, as shown, of a skeleton rim 2, spokes 3, and a hub 4. Sprockets 5 are formed on the outer periphery of the wheel, and the hub 4 has a ring 6 surrounding it, said ring having a base-flange 7 and a tapering boss 8. This ring may be secured to the hub 4 by shrinking it onto the hub or in any suitable manner to form a reinforce for said hub. The aperture 9 through the hub and sprocket-wheel may be rectangular in cross-section, and, as shown, said aperture is of greater interior diameter at the inner side of the hub, thence gradually tapering to a smaller diameter upon the outer side of said sprocket-wheel. The end of the axle 10 is squared and tapered to fit the aperture 9, the outer end of said axle being substantially flush with the outer surface of the sprocket-wheel. The end of the axle is provided with a threaded socket 11, and a screw 12, inserted from the outer face of the sprocket-wheel, is turned into the socket 11 to hold said sprocket-wheel firmly in place on the axle.

Two of the alined spokes 3 of the sprocket-wheel are provided with holes 13 at points diametrically opposite each other and near the outer rim 2 of the sprocket-wheel, said holes being in alinement with the aperture 9 in the hub and as remote therefrom as the size of the sprocket-wheel may permit.

The crank 14 consists of a plain bar, which may be of any suitable shape in cross-section and provided with two internally-threaded bosses 15 upon the inner surface of said crank at points which conform to the distance between the two holes 13. These threaded bosses 15 are reduced in size at their outer ends, as at 16, to provide the shoulder 17, said reduced outer ends being fitted to the holes 13 in the sprocket-wheel and firmly secured therein by the screws 18, turned into the threaded sockets 19 in the bosses 15. The outer end of the crank 14 is bored at 20 to accommodate a pedal. The plain wheel 21 is secured to the opposite end of the axle 10 from the sprocket-wheel 1. This plain wheel is of the same size as the sprocket-wheel 1 with the sprockets omitted, and the crank 22 is precisely the same in construction as crank 14 and is secured to the plain wheel 21 in the same manner as said crank 14 is secured to the sprocket-wheel 1. It will be noticed that the outer ends of the cranks 22 and 14 project in opposite directions outward from the wheels 1 and 21, and in this way a proper balance is secured.

From the foregoing it will be observed that the two cranks are secured to two wheels at opposite ends of the axle at some distance from the axis at opposite sides thereof. This arrangement gives an increased leverage and a better balance than the ordinary construction. Furthermore, all parts of the device— the crank, axle, sprocket-wheel, and plain wheel—can be readily assembled or detached, and in case of breakage of any one of the parts it can be supplied at a comparatively small cost. It will also be noticed that the screws 12 are prevented from accidental displacement by the cranks 14 and 22, as said cranks lie immediately over the heads of said screws.

I am aware that certain changes in the details of construction may be made without departing from the spirit and scope of my invention. I do not therefore wish to be understood as being restricted to the precise details and structure shown.

Having thus fully described my invention, what I claim is—

A bicycle crank mechanism consisting of an axle, a sprocket-wheel and a plain wheel fitted to the ends of said axle, screws for holding said wheels in place on said axle, cranks attached to said wheels near their peripheries, said cranks lying immediately over said screws to prevent their accidental removal, substantially as described.

In testimony whereof I have hereunto set my hand in presence of two subscribing witnesses.

CHRISTIAN ALLMAN.

Witnesses:
NICHOLAS C. KINDLER,
JOHN H. GESAMAN.